June 30, 1970   R. J. KLETT   3,518,167
HYDROGEN SULFIDE AND AMMONIA RECOVERY BY DEGASSING
AND DISTILLATION WITH AMMONIA RECYCLE
Filed Sept. 26, 1968
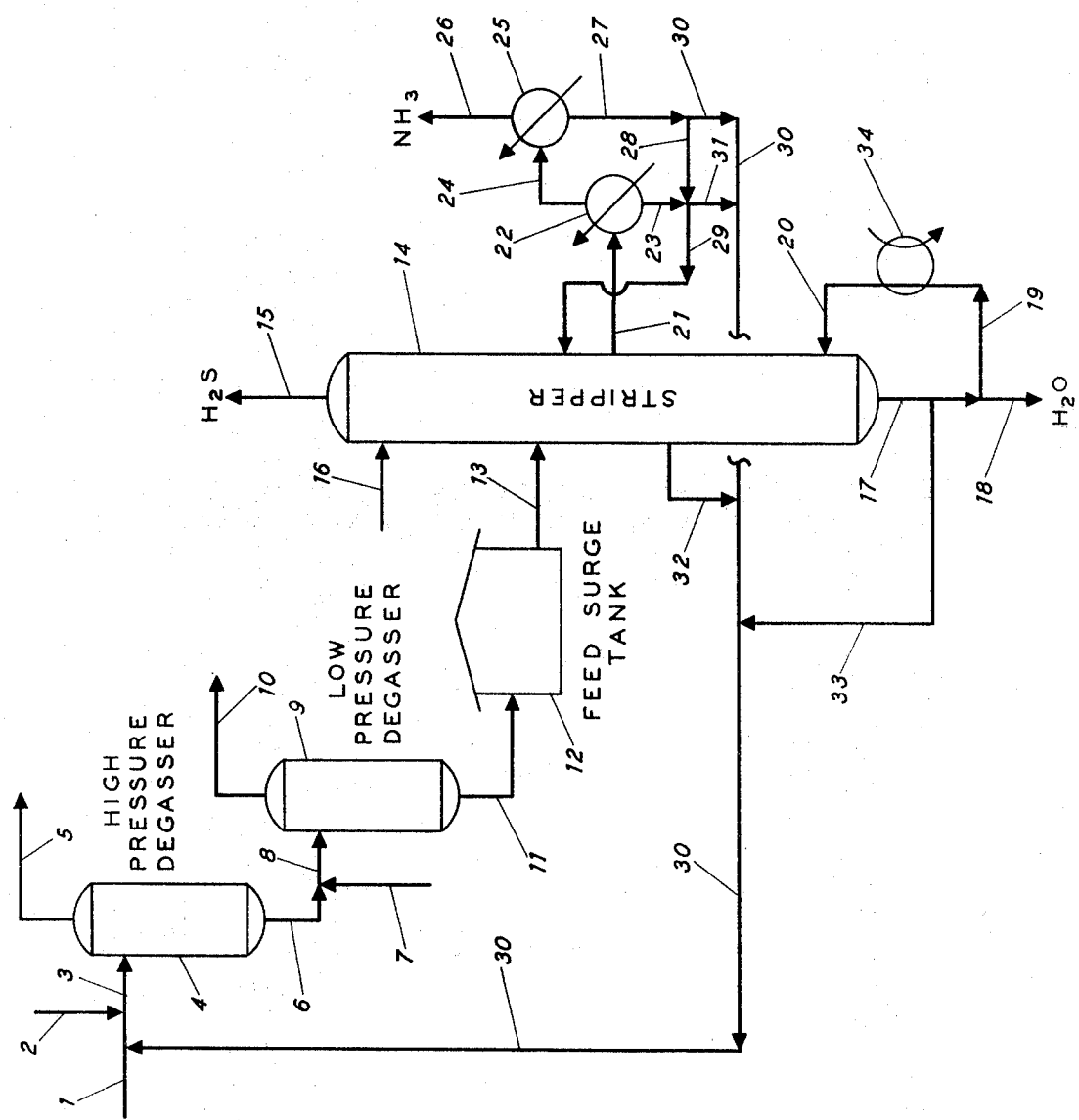
INVENTOR
ROBERT J. KLETT
BY *J. S. DeJonghe*
*C. J. Tomkin*
ATTORNEYS United States Patent Office 3,518,167
Patented June 30, 1970

3,518,167
HYDROGEN SULFIDE AND AMMONIA RECOVERY BY DEGASSING AND DISTILLATION WITH AMMONIA RECYCLE
Robert J. Klett, San Francisco, Calif., assignor to Chevron Research Company, San Francisco, Calif., a corporation of Delaware
Filed Sept. 26, 1968, Ser. No. 762,702
Int. Cl. B01d 3/06, 19/00
U.S. Cl. 203—78                                     6 Claims

ABSTRACT OF THE DISCLOSURE

Operation of a process to recover separate $H_2S$-rich and $NH_3$-rich streams from an aqueous solution of $H_2S$, $NH_3$, and light hydrocarbons under superatmospheric pressure, wherein an aqueous solution of $H_2S$ and $NH_3$ is fed to a stripper, is improved from a control and stability standpoint, and aqueous feed solutions of substantial or high $H_2S$ content are more advantageously handled by (1) combining an $NH_3$-rich, $H_2S$-lean condensate stream, obtained by partial condensation of a vapor sidestream withdrawn from the stripper, with the aqueous solution of $HN_3$, $H_2S$, and light hydrocarbons; then (2) removing light hydrocarbons as gases by reducing the pressure on the combined solution; (3) providing residence time for the combined solution; and then (4) feeding the combined aqueous feed stream to the stripper.

BACKGROUND OF THE INVENTION

Field of the invention

This invention relates to methods for recovering $H_2S$ and $NH_3$ from aqueous streams containing the same. More particularly, this invention relates to processes for separately recovering $H_2S$ and $NH_3$-rich streams from aqueous streams.

Decription of the prior art

In many hydroconversion processes applied to hydrocarbon oils, shale oil, tar sands, etc. of which catalytic hydrogenation, hydrofining or hydrodesulfurization and hydro-cracking are typical examples, $H_2S$ and $NH_3$ are produced as a result of reaction of hydrogen with sulfur compounds and nitrogen compounds contained in the oil. Sometimes this conversion of one or the other or both of the sulfur and nitrogen compounds is the desired reaction, while in other cases it is merely an incidental reaction. In a typical process, normally liquid hydrocarbon oil containing nitrogen compounds and sulfur compounds and recycle hydrogen-rich gas and makeup hydrogen are passed through a reaction zone, usually containing a catalyst, an elevated temperature and pressure at which at least a portion of the hydrocarbons are vaporized; and there is obtained as a reaction zone effluent a mixture of vaporized hydrocarbons, hydrogen, $H_2S$ and $NH_3$. The effluent may also contain heavier hydrocarbons, which are liquid at the reaction conditions. The reaction effluent is cooled to condense vaporized hydrocarbons, whereby the liquid hydrocarbons can be separated from hydrogen-rich recycle gas, which is then reused in the process.

When the reaction effluent contains both $H_2S$ and $NH_3$, it has been found that on cooling to temperatures below about 300° F. the $H_2S$ and $NH_3$ may react to form salts which sometimes cause clogging problems in the heat exchangers and the lines. Injection of water into the reaction effluent upstream of the heat exchangers has been used to wash out such deposits and/or to prevent their forming. This water injection can provide a means of removing much of the $NH_3$ formed, if rather large amounts of water are injected sufficient to dissolve the $NH_3$.

In a typical hydroconversion process, such as hydrotreatign or hydrocracking, there are considerable amounts of light hydrocarbon and hydrogen present in the reaction effluent. Upon washing $H_2S$ and $NH_3$ out of the reaction effluent, a portion of these light hydrocarbons, as well as a small portion of the hydrogen, will dissolve in the water phase, particularly if the washing is at a high pressure. In many hydroconversion processes, the washing is done at a pressure of 500 to 5,000 p.s.i.g., more typically 1,000 to 3,000 p.s.i.g. For example, in hydrotreating gas oil, the effluent from the hydrotreater typically is cooled by heat exchange to a temperature between about 100 and 150° F. at a pressure of 2,000 p.s.i.g. Because the water is mixed with the gaseous effluent from the hydrotreater reactor at high pressure and before the effluent is cooled to 100 to 150° F., singificant amounts of light hydrocarbons, such as methane, ethane, propane, butane, etc., will dissolve in the water.

These light hydrocarbons, as well as dissolved hydrogen, may be removed from the aqueous phase prior to treatment to remove $H_2S$ and $NH_3$ by reducing the pressure on the aqueous solution. It is desirable to retain $H_2S$ in the aqueous solution when the pressure is reduced because (1) the $H_2S$ is an impurity in the light hydrocarbon vapors; and (2) the $H_2S$ is preferably recovered in a single concentrated stream as a valuable byproduct in a subsequent $H_2S$ and $NH_3$ recovery process. However, in many instances, the content of $H_2S$ in the aqueous solution which is formed—e.g., in the overhead system of strippers or fractionators associated with hydroconversion processes—is too high for the $H_2S$ to be substantially completely retained in the solution when the pressure is reduced.

Another problem that exists according to previous methods to recover $H_2S$ and $NH_3$ separately from foul water containing the same resides largely in obtaining steady and stable control of the stripper used to recover $H_2S$ and $NH_3$, respectively. The present application is directed to $H_2S$ and $NH_3$ recovery wherein only one stripping column is used. One column operation for separate recovery for $H_2S$ and $NH_3$ is described in U.S. Pat. 3,335,071 issued to W. M. Bollen et al. and assigned to Chevron Research Company, and is illustrated in one embodiment in FIG. 2. In the process described in the Bollen et al. patent, an aqueous solution of $H_2S$ and $NH_3$ may be treated according to the following steps:

(a) Stripping $H_2S$ out of the second aqueous solution in a distillation column to obtain an $H_2S$-rich overhead stream;

(b) Removing a vapor sidestream comprised of $NH_3$, $H_2S$ and $H_2O$ from the distillation column;

(c) Partially condensing the vapor sidestream to obtain an $NH_3$-rich vapor and an $NH_3$-rich condensate; and (d) Recycling a portion of the $NH_3$-rich aqueous overhead condensate to the distillation column.

The disclosure of U.S. Pat. 3,335,071 is incorporated by reference into the present specification.

Recycling the $NH_3$-rich condensate to the $H_2S$ stripper is highly desirable for some purposes, but fluctuations in the $NH_3$ content in this stream tend to cause periodic upsets in the stripper operation. This is thought to be partly due to the considerable amounts of $NH_3$ contained in the recycle relative to the amount of $NH_3$ in the feed to the $H_2S$ stripper. Although it is not completely understood why, in some instances when the $NH_3$ content of the $NH_3$ stripper overhead condensate increases, a large "bubble" of $NH_3$ will travel up the stripper reducing the purity of the $H_2S$ overhead and requiring adjustment in the overhead control in the stripper. Also, increases in $NH_3$ content of the recycle $NH_3$-rich condensate result in higher pressures being required at the bottom of the $H_2S$ stripper when operating at a given temperature. Because these changes would occur relatively rapidly, steady and stable control of the stripper was not always attainable.

In summary, according to practices employed under the prior art, considerable amounts of $H_2S$ may be lost from the aqueous solution desired to be treated for separate recovery of $H_2S$ and $NH_3$ when the pressure is reduced on the aqueous solution so as to remove light hydrocarbons and/or hydrogen dissolved in the aqueous solution of $H_2S$ and $NH_3$. Also, according to previously employed methods for separately recovering $H_2S$ and $NH_3$, difficulties are incurred in attempting to obtain steady and stable operation of the $H_2S$ and $NH_3$ strippers. In the process of the present invention, these problems are substantially overcome.

SUMMARY OF THE INVENTION

According to the present invention, in a process for separately recovering $H_2S$ and $NH_3$ from a first aqueous solution comprised of $H_2S$, $NH_3$, and light hydrocarbons under superatmospheric pressure according to the steps:

(a) Degassing the first aqueous solution by reducing the pressure, thereby removing light hydrocarbons and obtaining a second aqueous solution comprised of $H_2S$ and $NH_3$;

(b) Stripping $H_2S$ out of the second aqueous solution in a distillation column to obtain an $H_2S$-rich overhead stream and an aqueous bottoms stream of reduced $H_2S$ content;

(c) Removing a vapor sidestream comprised of $NH_3$, $H_2S$ and $H_2O$ from the distillation column; and (d) Partially condensing the vapor sidestream to obtain an $NH_3$-rich vapor and an $NH_3$-rich condensate.

The improvement is made which comprises:

(e) Combining at least a portion of the $NH_3$-rich overhead condensate with the first aqueous solution to obtain a combined aqueous solution; then (f) Removing at least a portion of the hydrocarbons contained in the first aqueous solution in a degassing zone as vapors by reducing the pressure on the combined aqueous solution to obtain said second aqueous solution; and then (g) Passing the second aqueous solution to the distillation column.

Operating in this manner avoids direct recycle of the $NH_3$-rich condensate to the distillation column or stripper; and improved control and stability of the stripper is obtained. In addition, the recycle of the $NH_3$-rich overhead condensate from the $NH_3$ stripper to the degassing zone serves to retain $H_2S$ in the aqueous phase while degassing light hydrocarbons and/or hydrogen from the aqueous feed containing the $H_2S$-$NH_3$.

The improved stability of the stripper is thought to be largely a result of avoiding direct recycle of $NH_3$-rich condensate. According to the present invention, the $NH_3$-rich condensate is recycled to the degassing zone where it achieves or closely approaches equilibrium with the net feed to the stripper; and fluctuations in the feed composition are dampened out due to the extra residence time. A residence time of at least five minutes after combining the aqueous streams and prior to introduction to the stripper is desirable. Much more preferable, a residence time of about one to three hours is provided for the combined gross feed streams of recycle $NH_3$-rich condensate and net $N_2S$-$NH_3$ aqueous feed solution. Still more preferable, a residence time of between about 3 and 24 hours or longer is provided for the combined, that is gross, feed streams. Provision for residence time for the recycle $NH_3$-rich condensate prior to introduction to the $H_2S$ stripper is in contrast to previous operation wherein the recycle of $NH_3$-rich condensate was directly to the stripper.

Also, it has been found that, if a residence time of about 24 hours or longer is used, then oil may be essentially completely separated from the foul water feed streams so that the strippers are kept cleaner. Additionally, when the feed streams include foul water from fluid catalytic cracking units or the like, the residence time of about 24 hours or longer will allow hydrocyanide acids which are likely to be present in such four water streams to be converted to thiocyanate. Conversion of the hydrocyanide to thiocyanate helps minimize corrosion problems in the strippers.

It has been found that with the recycle of the $NH_3$-rich condensate large amounts of $H_2S$ in the aqueous feed streams to the present process may be dealt with without excessive losses of $H_2S$ in the light hydrocarbons and/or hydrogen from the degassing step. Under most conditions, the $H_2S$ content of the gases from the degassing step is very low. The degasser off-gases may be used as refinery fuel gas as only a very small amount of $SO_2$ will be produced by burning the gases. Thus air pollution is substantially reduced.

A number of streams containing $H_2S$ and/or $NH_3$ may be treated in the process of the present invention, but it is preferable that there be a vessel or some means to provide residence time and allow mixing of the $NH_3$-rich condensate and the net feed to the present process. For example, there may be provided simply a surge vessel with no removal of light hydrocarbons or a degasser to remove light hydrocarbons from at least one of the feed streams to the present process. In the more usual case, it is necessary to provide a degassing step which in many instances results in loss of $H_2S$ and/or extra expense to remove $H_2S$ from the light hydrocarbons when not using the process of the present invention. As indicated above, the $H_2S$ contents of the net feed streams may be relatively high in the present process but still dealt with without large $H_2S$ losses or $H_2S$ impurities in the degasser zone off-gases. The recycle of the $NH_3$ condensate to the degasser zone serves to retain $H_2S$ in the aqueous phase.

In the process of the present invention, it has been found that it is advantageous to use two stages of degassing. Use of two stages of degassing serve to further minimize the $H_2S$ losses in the light hydrocarbon streams which are removed from the aqueous solution when the pressure is reduced on the aqueous solution in the degassing zone. The first stage of degassing is a high pressure degassing stage wherein the pressure is maintained between 50 and 500 p.s.i.g. Preferably the pressure is maintained at about 70 to 200 p.s.i.g. The liquid phase aqueous solution from the high pressure degassing stage is then passed to a low pressure degassing stage.

Aqueous treams containing $H_2S$ and/or $NH_3$ together with small amounts of light hydrocarbons, which light hydrocarbons are dissolved in the aqueous solution due to relatively low pressures, for example, 10 p.s.i.g. to 100 p.s.i.g., are advantageously introduced to the process of the present invention by combining such streams with the aqueous solution fed to the low pressure degasser. The low pressure degasser is maintained at a pressure between 0 p.s.i.g. and 50 p.s.i.g., preferably between 1 p.s.i.g. and 10 p.s.i.g.

BRIEF DESCRIPTION OF THE DRAWING

The drawing schematically illustrates a preferred embodiment of the present process for separately recovering $H_2S$ and $NH_3$ wherein two degassing stages are used.

DETAILED DESCRIPTION OF THE DRAWING AND THE INVENTION

Referring now in more detail to the drawing, an aqueous feed stream containing $H_2S$ and $NH_3$ is introduced to the process via line 1. In a preferred embodiment of the present invention, this aqueous feed stream is obtained by commingling or contacting the effluent from a hydrocracking reactor at a pressure of about 2,000 p.s.i.g. with water. As indicated in the discussion under "Background of the Invention," this contacting is carried out to remove $NH_3$ and $H_2S$ from the hydrocracker reactor effluent. Because the hydrocracker reactor effluent contains substantial amounts of hydrogen and light hydrocarbons, the aqueous solution which is formed is comprised of hydrogen and light hydrocarbons in addition to $H_2S$ and $NH_3$.

In the process of the present invention, this aqueous solution is combined with the recycle $NH_3$-rich aqueous stream obtained from the stripper, as will be described in more detail hereinbelow. The $NH_3$-rich aqueous solution is recycled via line 30.

A stream rich in $H_2S$ obtained from the overhead of one of the stripping distillation columns used to remove light hydrocarbons from the hydrocracker effluent product is introduced to the process via line 2. Among the many $H_2S$-rich streams that may be treated in the process of the present invention are those streams derived from steam stripping liquid hydrocarbon effluents from hydrotreating or hydrofining processes. These liquid hydrocarbon effluents contain $H_2S$ and light hydrocarbons which are removed by stripping or distillation. The stripper or distillation column overhead vapors which result from the stripping operation contain appreciable amounts of $H_2S$ which dissolve to a significant extent in the water formed when the overhead is partially condensed. Frequently the stripping is carried out at low pressures, for example, 5 to 50 p.s.i.g., in the overhead accumulator. In this instance, these overhead condensate streams may be introduced to the process of the present invention via line 7. It is particularly important to remove light hydrocarbons from the overhead condensate streams when the $H_2S$, which is removed from the $H_2S$ stripper via line 15, is desired in a highly purified form. For example, when the $H_2S$ is to be used as feed to a Claus process for manufacture of sulfur, it is desirable that the $H_2S$ stream contain less than 0.1 volume percent hydrocarbons.

In some instances, the hydrocarbon effluent from the hydrotreating or hydrocracking process will be stripped or fractionated to remove $H_2S$ and light hydrocarbons at a pressure above 50 p.s.i.g. For example, in U.S. Pat. 3,356,608, a process is described wherein gas oil and hydrogen are contacted with a sulfactive hydrogenation catalyst and the effluent hydrocarbon stream, after separation of recycle hydrogen, is steam stripped at pressures above 150 p.s.i.g. Upon condensing the overhead from the stripper, an aqueous phase is formed which may be very rich in $H_2S$ compared to aqueous solutions formed in the presence of $H_2S$ at lower $H_2S$ partial pressures.

Referring again to the drawing, the combined streams 1, 2 and 30 are introduced via line 3 to the high pressure degasser 4. In order ot achieve low $H_2S$ contents in the off-gases, the high pressure degasser is preferably maintained at a pressure of about 185 p.s.i.g. and a temperature of about 80° F. Lower pressures and higher temperatures will result in increased $H_2S$ contents in the off-gas. Light hydrocarbons and hydrogen are removed via line 5 from the top of the high pressure degassing vesesl. When operating at about 100 to 200 p.s.i.g. and 80 to 100° F., the $H_2S$ content of stream 5 is generally less than 3 volume percent. When operating at high pressure and low temperature for the high pressure degasser in accordance with the present invention, the $H_2S$ content may be maintained between about 0.1 to 2.0 volume percent. Thus stream 5 has a low $H_2S$ content and is generally suitable as refinery fuel gas. The partially degassed aqueous solution is withdrawn from the bottom of the high pressure degasser via line 6.

An aqueous solution of $H_2S$, $NH_3$ and small amounts of dissolved hydrocarbons, which aqueous solution is obtained as overhead condensate from a hydrocarbon stripper operating at an overhead pressure of about 50 p.s.i.g., is introduced via line 7. The combined aqueous streams in lines 6 and 7 are passed via line 8 to low pressure degasser 9. The low pressure degasser is preferably maintained at a pressure of about 2 p.s.i.g. Light hydrocarbons are withdrawn in line 10 from the low pressure degasser, and an aqueous solution of $H_2S$ and $NH_3$ is withdrawn from the bottom of the degasser via line 11. The $H_2S$ content of stream 10 is generally less than about 4 volume percent when operating in accordance with the present invention. The percent of $H_2S$ in the low pressure degasser off-gases may be reduced further, for example, to the range for the high pressure degasser, by increasing the amount of $NH_3$-rich condensate and by lowering the temperature and raising the pressure. In most instances, the major portion of the off-gases, which are mostly hydrogen and methane, are released in the high pressure degasser. Usually about 80 to 90 volume percent of the dissolved gases flash off in the high pressure degasser. Therefore, there is only a relatively small quantity of $H_2S$ carried off with the off-gases from the low pressure degasser. Thus, in accordance with the present invention, nearly all the $H_2S$ is left in the aqueous phase so that it may be recovered as one overhead stream from the $H_2S$ stripper.

The aqueous solution from the low pressure degasser is introduced to feed surge tank 12 wherein a residence time preferably between 3 and 24 hours is provided. The feed surge tank 12 should be a floating roof tank or inert gas blanketed. It air is allowed to come in contact with the aqueous solution, hydrogen sulfide will be oxidized to form free sulfur.

Aqueous solution is withdrawn from the feed surge tank via line 13 and introduced to stripper 14. Due to heat input in the bottom of the stripper, hot upflowing vapors are generated which serve to strip $H_2S$ out of the aqueous solution. A cool stream of water is introduced via line 16 to the upper part of the $H_2S$ stripper so as to generate a downward flowing aqueous stream which serves to fractionate the $NH_3$ from the $H_2S$. A relatively pure stream of $H_2S$ is withdrawn via line 15 from the top of the $H_2S$ stripper. The $NH_3$ content in this $H_2S$ stream is usually less than 2 to 5 weight percent, commonly as low as a few tenths of a percent; and preferably the $H_2S$ stripper conditions are maintained so as to result in an $NH_3$ content of less than 100 p.p.m., for example, 10 to 30 p.p.m.

Stripper 14 operates similar to the operation indicated in U.S. Pat. 3,335,071, issued May 19, 1964 to W. M. Bollen, G. H. Goff, and W. L. Short. An aqueous solution containing $NH_3$ and $H_2S$ is introduced by line 12 into single distillation column 14, which operates at superatmospheric pressure. Hot upflowing vapors are generated at the bottom of column 14, and an overhead $H_2S$ product containing only small amounts of $NH_3$ is obtained in line 15. The temperature at the top of column 14 is maintained sufficiently low such that the vapor has the desired purity. A wash water stream is introduced at the top of the column through line 16 to assist in the removal of $NH_3$ and to effect cooling. Liquid is withdrawn from the bottom of the column through line 18. This liquid comprises water containing no more than noncontaminating amounts of $H_2S$ and $NH_3$, a situation which is accomplished by generating stripping vapors at the bottom of the column by passing a portion of the bottoms via line 19 through reboiler 34.

A vapor sidestream is withdrawn from the column through line 21 below the feed point position, preferably at a point such that this intermediate sidestream contains considerably more $NH_3$ than $H_2S$ on a weight basis. This sidestream is treated to form an $NH_3$-enriched vapor stream by partially condensing in condenser 22 at conditions controlled to give an enriched vapor stream in line 24 of controlled water content, and a condensate in line 23 containing more $NH_3$ than $H_2S$. The enriched vapor stream in line 24 is then partially condensed in condenser 25 to form as the uncondensed portion $NH_3$ vapor containing no more than small amounts of $H_2S$, and as the condensed portion water containing $NH_3$ and substantially all or at least a large part of the $H_2S$ in the enriched stream 24.

The $NH_3$-rich condensate in lines 27 or 23, or in the combined stream obtained by adding the condensate in line 27 to that in 23, is recycled to high pressure degasser 4. The choice of $NH_3$-rich condensate from line 23 or line 27 or the proportions of the $NH_3$-rich condensate obtained from condenser 22 and from condenser 25 is preferably adjusted so that the condensate recycled in line 30 contains a large amount of $NH_3$ relative to $H_2S$.

Typically, the ratio of $NH_3$ to $H_2S$ in the condensate is between 10:1 and 2:1 on a molar basis. Preferably, the ratio of $NH_3$ to $H_2S$ is between 3:1 to 6:1 on a molar basis.

In the present invention it is preferred to control the amount of $NH_3$-rich condensate which is recycled, as well as the ratio of $NH_3$ to $H_2S$ in the recycle, so that the ratio of $NH_3$ to $H_2S$ of the combined streams fed to the high pressure degasser is at least 1.1:1.0 on a molar basis. For streams which contain more than a percent or two of dissolved $NH_3$ and $H_2S$, it is preferable to use more recycle $NH_3$-rich condensate so that the ratio of $NH_3$ to $H_2S$ (calculated as separate species) is at least 1.2 to 1.0, and in many instances it is preferred to have as much as one and one-half to about five times as much $NH_3$ as $H_2S$.

As indicated previously, the recycle of $NH_3$-rich condensate in line 30 serves to decrease the $H_2S$ losses from high pressure degasser 4 in line 5 and from low pressure degasser 9 in line 10. Also, the recycle of the $NH_3$-rich condensate to the degassing section rather than directly to stripper 14 helps to stabilize the operation and control of stripper 14. The concentration of $NH_3$ in the $NH_3$-rich condensate is a function of ambient temperatures and is more particularly a function of the temperature of the coolant used for partial condensers 22 and 25. These and other variables with respect to stripper 14 can cause the $NH_3$-rich condensate in line 30 to vary in $NH_3$ and $H_2S$ concentration.

According to the present invention it is preferred to recycle the $NH_3$-rich condensate obtained by partial condensation of a vapor sidestream withdrawn from the stripper. However, an $NH_3$-rich aqueous stream which has a higher concentration of $NH_3$ than $H_2S$ on a molar basis may also be obtained by withdrawing a liquid sidestream directly from stripper 14. Thus, $NH_3$-rich liquid may be withdrawn in line 32 from the lower part of stripper 14 and recycled via line 30.

Also, a stream containing more $NH_3$ than $H_2S$ on a molar basis may be obtained from the bottom of stripper 14. Generally, stripper 14 is operated at superatmospheric pressures in the range between 20 and 150 p.s.i.g. and rarely above 400 p.s.i.g. The temperature at the bottom of stripper 14 is fixed substantially by the pressure employed and is between about 210 and 450° F., preferably between about 275° F. and 365° F. At these latter temperatures (about 275 to 365° F.) a relatively pure water stream is obtained so that there is not a sufficient amount of $NH_3$ in the bottoms from stripper 14 to justify recycling to high pressure degasser 4; that is, in the more usual embodiments of the present invention the water removed from stripper 14 via line 18 is too pure to justify recycling via lines 33 and 30. However, in some instances the bottoms water purity will be low and there will be a sufficient amount of $NH_3$ present in the bottoms to justify recycling to high pressure degasser 4. For example, when stripper 14 is operated at lower temperatures and/or when the stripping of the feed in line 13 to the stripper is less severe, there will be sufficient $NH_3$ in the bottoms from stripper 14 so that it is advantageous to recycle a portion of the bottoms via lines 33 and 30 to high pressure degasser 4. If the stripper is operated, for example, using low pressure stripping steam, then the $NH_3$ content of the water is more likely to increase than if the stripper is operated at higher temperatures and pressures using high pressure steam or a reboiler.

In the carrying out of the process of the present invention in those embodiments wherein a vapor sidestream is withdrawn from stripper 14 and partially condensed, one or more stages of partial condensation may be used depending on numerous factors. For example, if the $NH_3$ is to be recovered as high purity product $NH_3$, then it is preferable to employ at least two stages of partial condensation to insure removal of substantially all of the $H_2S$ in the vapor phase sidestream withdrawal. The $H_2S$ is removed with each stage of partial condensation because the $NH_3$-rich condensate which is formed in each stage of partial condensation has a high tendency to absorb or draw $H_2S$ into the liquid phase so as to leave a high purity $NH_3$ vapor phase. In some instances, however, there are no facilities for handling product $NH_3$ or there is not a ready market for $NH_3$ or there is not a sufficient quantity of $NH_3$ to justify handling the $NH_3$. In these instances it is frequently preferred to burn or incinerate the $NH_3$ to form nitrogen. If the particular locality does not require an extremely low amount of $SO_2$ in effluent stack gases or if there are ready means to dilute the $SO_2$ obtained after burning the $NH_3$, then there is no need to purify the $NH_3$ to very low $H_2S$ concentrations. Thus, in these latter instances only one stage of partial condensation is generally required.

In this application, $NH_3$-rich, broadly speaking, means the molar concentration of $NH_3$ is greater than the molar concentration of $H_2S$. More usually, $NH_3$-rich connotes more than about 2 or 3 moles of $NH_3$ per mole of $H_2S$ in the stream referred to. For product $NH_3$-rich streams the ratio of moles $NH_3$ to moles $H_2S$ is usually greater than 9 to 1, and frequently as high as 50 or 100 to 1.

Also, in this application the terms stripper and distillation column are used interchangeably. Distillation column is meant to include any means to separate components such as $H_2S$ or $NH_3$ from water by means of differences in equilibrium vaporization values or by virtue of relative volatilities being greater than one.

The disclosures of my two applications entitled "Hydrogen Sulfide Recovery" and "Hydrogen Sulfide and Ammonia Recovery," filed the same day as the present application, are incorporated by reference into the present application. The Hydrogen Sulfide Recovery patent application is directed largely to one column operation wherein $NH_3$-rich aqueous solution is obtained directly from the single column and recycled to the degassing zone. The Hydrogen Sulfide and Ammonia Recovery patent application is directed largely to two column operation for separate recovery of hydrogen sulfide and ammonia, with recycle to the degassing zone of $NH_3$-rich condensate from the overhead of the $NH_3$ stripper.

EXAMPLE

This example illustrates the advantages obtained using the process of the present invention for treating aqueous streams which contain large amounts of $H_2S$ relative to $NH_3$ in addition to light hydrocarbons and/or hydrogen dissolved in the aqueous stream due to high pressure.

A solution comprised of about 984 pounds of $H_2S$, 516 pounds of $NH_3$, and about 760 standard cubic feet of hydrogen plus light hydrocarbons dissolved in 27,820 pounds of $H_2O$ is obtained by water washing a hydrocracker reactor effluent. The hydrocracker reactor effluent stream which is water washed is at about 250° F. and 1,250 p.s.i.g. The aqueous stream thus obtained is introduced via line 1 to the process schematically illustrated by the drawing, except that there is no recycle $NH_3$-rich condensate to the high pressure degasser. Part of the $NH_3$-rich sidestream condensate is, however, recycled directly to the stripper.

An aqueous solution comprised of 28,000 pounds of $H_2O$, 436 pounds of $H_2S$ and only trace amounts of $NH_3$ is obtained as overhead condensate from a fractionating column in the fractionation section of the hydrocracking unit. This stream is introduced via line 2 to the process. In this first instance, the $NH_3$-rich condensate formed by partial condensation of the vapor sidestream withdrawn from the stripper is recycled directly to the stripper. The abovementioned streams and the resulting streams corresponding to the numbered streams shown in the drawing are summarized in the table below:

TABLE I

| Stream No. | $H_2O$, lb./hr. | $H_2S$, lb./hr. | $NH_3$, lb./hr. |
|---|---|---|---|
| 1 | 27,820 | 984 | 516 |
| 2 | 28,000 | 436 | 0 |
| 3 | 55,820 | 1,420 | 516 |
| 5 | 2 | 390 | 0 |
| 8 | 55,818 | 1,030 | 516 |
| 10 | 1 | 10 | 0 |
| 11 | 55,817 | 1,020 | 516 |
| 15 | 6 | 1,010 | 0 |
| 26 | 3 | 5 | 499 |

The combined streams 5 and 10 contain about 760 s.c.f. of hydrogen plus light hydrocarbons.

Using the process of the present invention, identical streams 1 and 2 are fed to the process schematically illustrated in the drawing. In addition, a portion of the sidestream condensate from the stripper is recycled via line 30 to the high pressure degasser. This recycle stream is rich in $NH_3$ relative to $H_2S$. The moles $NH_3$ in the recycle stream are 26.2; the moles $H_2S$ total 8.7, thus resulting in a molar ratio of $NH_3$ to $H_2S$ of about 3.01. There is sufficient $NH_3$ in the $NH_3$ recycle via line 30 so that the resulting combined streams in line 3 have a ratio of $NH_3$ to $H_2S$ on a molar basis greater than 1.0. Preferably, the ratio of $NH_3$ to $H_2S$ in stream 3 is maintained above 1.1. In this example, the ratio of $NH_3$ to $H_2S$ is 1.22. The feed streams and resulting streams are summarized below:

TABLE II

| Stream No. | $H_2O$, lb./hr. | $H_2S$, lb./hr. | $NH_3$, lb./hr. |
|---|---|---|---|
| 1 | 27,820 | 984 | 516 |
| 2 | 28,000 | 436 | 0 |
| 30 | 568 | 148 | 444 |
| 3 | 56,388 | 1,568 | 960 |
| 5 | 1 | 2 | 0 |
| 8 | 56,388 | 1,564 | 960 |
| 10 | 1 | 2 | 0 |
| 11 | 56,387 | 1,562 | 960 |
| 15 | 6 | 1,406 | 0 |
| 26 | 3 | 5 | 499 |

The combined streams 5 and 10 contain about 760 s.c.f. of hydrogen plus light hydrocarbon gases.

As can be seen from the comparison of streams 5 and 10 in Table II to streams 5 and 10 in Table I, the $H_2S$ losses are drastically reduced. Using the process of the present invention, the $H_2S$ losses are reduced from 400 pounds per hour (Table I) to 4 pounds per hour (Table II). Thus the process of the present invention results in reducing the $H_2S$ present in the flashed off-gases by a factor of 100 in this example. Thus recycling $NH_3$-rich condensate from the stripper is of particular advantage when feeding streams which have relatively large amounts of $H_2S$ compared to $NH_3$. When the $H_2S$ concentrations in the net feed streams are lower, the advantage is correspondingly reduced, but generally the $H_2S$ loss is reduced by a factor of at least five. Also, the recycle of the $NH_3$-rich condensate will still serve to some degree to help retain $H_2S$ in the aqueous phase so that it may be recovered via line 15 as a unitary product stream. Furthermore, the recycling of $NH_3$-rich condensate to the degassing section instead of directly to the $H_2S$ stripper has the very important advantage of improving control stability of the $H_2S$ stripper and the $NH_3$ stripper.

Although various specific embodiments of the invention have been described and shown, it is to be understood they are meant to be illustrative only and not limiting. Certain features may be changed without departing from the spirit or essence of the invention. It is apparent that the invention has broad application to the recovery of separate streams of $H_2S$ and $NH_3$ from aqueous solutions of the same. Accordingly, the invention is not to be construed as limited to the specific embodiments illustrated but only as defined in the following claims.

I claim:

1. A process for separately recovering an $H_2S$-rich stream and an $NH_3$-rich stream from a first aqueous solution comprising $H_2O$, $H_2S$, $NH_3$ and dissolved methane under superatmospheric pressure according to the steps:

(a) combining at least a portion of an $NH_3$-rich condensate with the first aqueous solution to obtain a combined aqueous solution having a molar ratio of $NH_3$ to $H_2S$ of at least 1.1 moles $NH_3$ to 1.0 mole $H_2S$;
    (b) removing from the combined aqueous solution at least 80 volume percent of the dissolved methane as a gas by reducing the pressure on the combined aqueous solution to a pressure at least below 200 p.s.i.g. to thereby flash off methane;
    (c) providing at least one hour residence time for the combined aqueous solution; and then
    (d) passing the combined aqueous solution to a first distillation column;
    (e) distilling $H_2S$ out of the combined aqueous solution in the distillation column to obtain an $H_2S$-rich stream;
    (f) removing a vapor sidestream comprising $NH_3$, $H_2S$ and $H_2O$ from the distillation column; and
    (g) partially condensing the vapor sidestream to obtain an $NH_3$-rich vapor stream and said $NH_3$-rich condensate.

2. A process according to claim 1, wherein between about 3 and 24 hours residence time is provided for the combined aqueous solution before passing the combined aqueous solution to the first distillation column.

3. A process according to claim 1, wherein at least 24 hours of residence time is provided for the combined aqueous solution before passing the combined aqueous solution to the first distillation column.

4. A process according to claim 1 wherein the combined aqueous solution is degassed first in a high pressure degasser at a pressure between 50 and 500 p.s.i.g. and then is degassed in a low pressure degasser at a pressure between 0 and 50 p.s.i.g.

5. A process according to claim 4 wherein the combined aqueous solution is degassed first in a high pressure degasser at a pressure of between 70 and 200 p.s.i.g. and then is degassed in a low pressure degasser at a pressure between 1 and 10 p.s.i.g.

6. A process according to claim 4 wherein the gross feed to the high pressure degasser comprises:

(a) an aqueous solution of $H_2S$, $NH_3$, light hydrocarbons, and hydrogen (stream $a$) obtained by contacting with water the effluent from a hydroconversion process at a pressure of at least 500 p.s.i.g.,
    (b) an aqueous solution comprised of $H_2S$ and light hydrocarbons (stream $b$), wherein the $H_2S$ content is such that the combined streams ($a$) and ($b$) have an $NH_3$ to $H_2S$ molar ratio less than 1.1:1.0, and
    (c) the $NH_3$-rich condensate stream (stream $c$) from the overhead of the $NH_3$ stripper, and wherein the amount of $NH_3$ in the $NH_3$-rich condensate recycled from the stripper is sufficient so that the combined streams ($a$), ($b$) and ($c$) have an $NH_3$ to $H_2S$ molar ratio of at least 1.1:1.0.

(References on following page)

References Cited

UNITED STATES PATENTS

| | | | |
|---|---|---|---|
| 3,096,156 | 7/1963 | Kaunert et al. | 23—181 |
| 3,335,071 | 8/1967 | Bollen et al. | 203—85 |
| 3,340,182 | 9/1967 | Berkman et al. | 23—181 |
| 3,356,608 | 12/1967 | Franklin | 208—212 |
| 3,365,374 | 1/1968 | Short et al. | 203—78 |
| 3,365,393 | 1/1968 | Wooten | 208—212 |
| 3,404,072 | 10/1968 | Bollen et al. | 23—193 |

FOREIGN PATENTS 166,743  1/1954  Australia.

WILBUR L. BASCOMB, JR., Primary Examiner

U.S. Cl. X.R.

203—79, 80, 84, 85, 88, 98, 99; 23—181, 193; 55—43, 55; 208—212